(12) United States Patent
Kitagawa et al.

(10) Patent No.: US 7,916,223 B2
(45) Date of Patent: Mar. 29, 2011

(54) DUAL PANEL LIQUID CRYSTAL DISPLAY DEVICE

(75) Inventors: Yoshiro Kitagawa, Kanagawa (JP); Hidenori Ikeno, Kanagawa (JP); Shinichi Uehara, Kanagawa (JP); Takashi Yatsushiro, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 742 days.

(21) Appl. No.: 11/736,513

(22) Filed: Apr. 17, 2007

(65) Prior Publication Data

US 2007/0242028 A1    Oct. 18, 2007

(30) Foreign Application Priority Data

Apr. 18, 2006  (JP) ................................. 2006-114085
Apr. 17, 2007  (JP) ................................. 2007-108283

(51) Int. Cl.
*G02F 1/1335* (2006.01)
*G02F 1/1347* (2006.01)

(52) U.S. Cl. ............................................ 349/15; 349/74

(58) Field of Classification Search .................... 349/15, 349/74–83
See application file for complete search history.

(56) References Cited

U.S. PATENT DOCUMENTS

| | | | | |
|---|---|---|---|---|
| 6,040,807 A * | 3/2000 | Hamagishi et al. | ............... | 345/6 |
| 6,288,172 B1 | 9/2001 | Goetz et al. | ................... | 525/200 |
| 6,332,684 B1 * | 12/2001 | Shibatani et al. | ............... | 353/31 |
| 2004/0183972 A1 | 9/2004 | Bell | ............................... | 349/117 |
| 2009/0147186 A1 * | 6/2009 | Nakai et al. | ..................... | 349/74 |

FOREIGN PATENT DOCUMENTS

| | | | |
|---|---|---|---|
| GB | 2405516 A | * | 3/2005 |
| JP | 59-189625 | | 12/1984 |
| JP | 64-10223 | | 1/1989 |
| JP | 64-010223 | | 1/1989 |
| JP | 6-64604 | | 3/1994 |
| JP | 11-508622 | | 7/1999 |
| JP | 2001-201764 | | 7/2001 |
| JP | 2004-512564 | | 4/2004 |
| JP | 2006-16515 | | 1/2006 |
| WO | WO 0235277 A1 | * | 5/2002 |
| WO | WO 2007040127 A1 | * | 4/2007 |

OTHER PUBLICATIONS

Chinese Official Action dated Mar. 31, 2010.

* cited by examiner

*Primary Examiner* — Mark A Robinson
*Assistant Examiner* — Michael Inadomi
(74) *Attorney, Agent, or Firm* — Hayes Soloway P.C.

(57) ABSTRACT

A LCD device includes first and second LCD panels stacked one on another. Each of the first and second LCD panels includes a pair of transparent substrates, a liquid crystal layer sandwiched therebetween, and a pair of polarizing films sandwiching therebetween the pair of transparent substrates. A light diffusion layer having light diffusion function is interposed between the first LCD panel and the second LCD panel. The light diffusion layer reduces the intensity of the light passed by the first LCD panel, thereby alleviating the periodicity of the arrangement of dark areas and bright areas to alleviate the moire caused by light interference.

22 Claims, 16 Drawing Sheets

| MOIRE GRADE | DEGREE OF MOIRE |
|---|---|
| 5 | NOT PRESENT |
| 4 | SCARCELY CONCEIVED |
| 3 | CONCEIVED WITHOUT DISCOMFORT |
| 2 | FEEL DISCOMFORT |
| 1 | FEEL LARGE DISCOMFORT |

| MOIRE GRADE | MOIRE REDUCTION |
|---|---|
| 5 | −26dB |
| 4 | −23dB |
| 3 | −21dB |
| 2 | −19dB |
| 1 | −18dB |

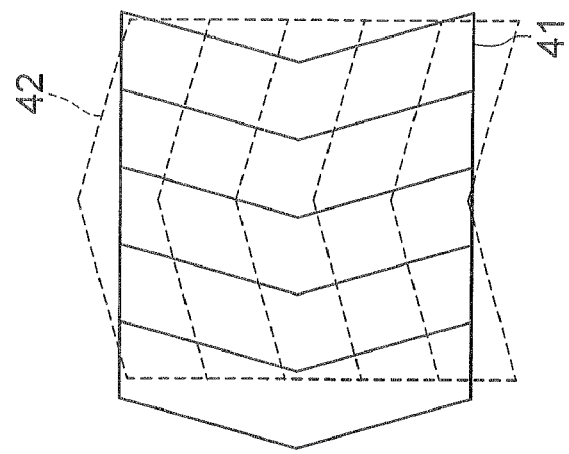
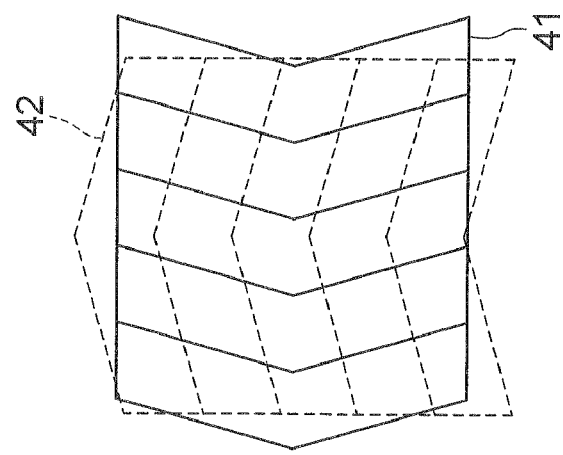
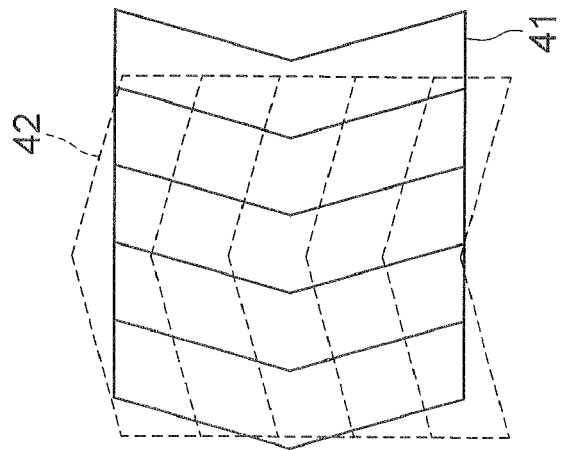

FIG. 19

|  | BRIGHTEST LUMINANCE | MOIRE |
|---|---|---|
| 1st SAMPLE | △ | ABSENT |
| 2nd SAMPLE | ○ | ABSENT |
| 3rd SAMPLE | ◎ | ABSENT |
| 1st COMPARATIVE EX. | ◎ | PRESENT |
| 2nd COMPARATIVE EX. | ◎ | PRESENT |

DUAL PANEL LIQUID CRYSTAL DISPLAY DEVICE

This application is based upon and claims the benefit of priority from Japanese patent application No. 2006-114085 filed on Apr. 18, 2006, and Japanese patent application No. 2007-108283 filed on Apr. 17, 2007, the disclosure of which is incorporated herein in its entirety by reference.

BACKGROUND OF THE INVENTION

1. Field of the Invention

The present invention relates to a liquid crystal display (LCD) device, and more particularly to a direct-view-type LCD device capable of achieving a higher contrast ratio.

2. Description of the Related Art

LCD devices have the advantage of realizing a higher definition with a lower power dissipation and are used for a wide range of applications from a small-screen cellular phone to a large-screen television monitor. However, there is a defect in the LCD device that the contrast ratio of the LCD panel alone in a dark environment is lower than that of a CRT, that (3000:1) of a plasma display panel, which are also used as a television monitor similarly to the LCD panel, and that of a field-emission display panel called FED/SED, and is at most on the order of 1000:1. Therefore, there is pointed out the problem of insufficient feeling of live performance during representing image sources such as a motion picture having a higher power of expression especially in the dark area.

In order to solve the above problem, there has been developed a technology for controlling the light intensity of the backlight according to the image to be displayed, thereby improving the contrast ratio on the display screen, with the contrast ratio of the LCD panel itself being left intact. In a conventional backlight unit having a surface-emission light source, however, a cold-cathode tube having a narrow dynamic range is used as the light source. Thus, improvement of the contrast ratio by controlling the light intensity of the backlight according to the image to be displayed is limited to around 2000 to 3000:1.

It is to be noted that the cold-cathode tube of the backlight unit has a shape of rod. Thus, if there are a high luminance area and a low luminance area concurrently represented on the same screen of the LCD device, the luminance of the backlight cannot be regulated area by area, resulting in a poor improvement of the contrast ratio obtained by the luminance control of the backlight. Therefore, if the image represented on the screen has a higher luminance area and yet is desired to emphasize the reproducibility in the lower luminance area, the effective contrast ratio is lowered due to the presence of the higher luminance area.

In order to solve the above problems, the contrast ratio of the LCD panel should be drastically improved. However, as described before, the contrast ratio of the LCD panel alone is at most about 1000:1. Techniques for manufacturing LCD devices capable of remarkably improving the contrast ratio thereof without improving the contrast ratio of the LCD panel itself are described, for example, in Patent Publications JP-1989-10223A and JUM-1984-189625A. In these technologies, a multi-panel LCD structure wherein two or more LCD panels are stacked one on another is employed in a LCD device to reduce the black luminance, i.e., luminance upon display of dark image, thereby improving the total contrast ratio of the LCD device. JP-1989-10223A describes a multi-panel LCD device that achieves a contrast ratio exceeding the contrast ratio of a LCD device having a single LCD panel, which fact is confirmed by measuring the overall contrast ratio of the LCD device by using laser. It is described therein that two-panel LCD device achieves improvement of contrast ratio up to about 100:1 by using LCD panels having a contrast ratio of about 10 to 15:1, and that three-panel LCD device achieves a contrast ratio of 1000:1.

The technique of the multi-panel LCD device is also described in Patent Publications JP-2004-512564A and JP-2001-201764A. The technique described in JP-2004-512564A does not relate to a LCD device realizing a higher contrast ratio, and related to the technique of automatic stereoscopic image display. The technique described in JP-2001-201764A does not relate to a LCD device realizing a higher contrast ratio, and relates to the technique of uniquely designed LCD device by using the multi-panel LCD device.

For driving a projection LCD device having the multi-panel LCD structure, a common signal can be used to drive all the LCD panels without involving any problem, because these LCD panels pass the light substantially perpendicular to the LCD panels to project an image on a screen. However, such a common signal involves a problem in an ordinary direct-view LCD device having the multi-panel LCD structure, wherein a light source emitting a scattering light is used for image display as in the case of the LCD device using a backlight unit. The problem is that the distance or gap between adjacent LCD panels generates a parallax depending on the viewing angle of an observer, the parallax preventing the light passed by a pixel of the rear-side (or light-receiving-side) LCD panel from passing through the corresponding pixel of the front-side (or light-emitting-side) LCD panel. If the observer observes the display screen in a slanted viewing directions the parallax deviates the direction of the pixel of the front-side LCD panel from the corresponding pixel of the rear-side LCD panel, and thus an edge of the image in particular, across which the brightness of image is significantly changed in general, will be observed as double lines. Thus, the observer feels a sense of discomfort.

FIGS. 23A, 23B, and 23C schematically show the image of pixels of the multi-panel LCD structure located at different positions of the display screen, as observed from the front center of the display screen. The multi-panel LCD structure includes two LCD panels in this case. FIG. 23A shows the image of a pixel located on the observers' left of the display screen, FIG. 23B shows another pixel located at the center of the display screen, and FIG. 23C shows the image of another pixel located on the observers' right of the display screen.

In the case shown in FIG. 23B, the pixel of the front-side LCD panel and the pixel of the rear-side LCD panel are observed to exactly overlap each other, without causing any problem. However, as shown in FIGS. 23A and 23C, the pixel of the front-side LCD panel and the pixel of the rear-side LCD panel are observed not to overlap each other, causing the problem of reduction in the luminance. In addition, the deviation of the pixels generates a bright area and a dark area which are arranged periodically, to generate an interference pattern such as a moiré. Thus, the image quality of the LCD device is degraded. The dark area is generally formed by interconnect line or black matrix hereinafter, simply referred to as black matrix) of the LCD panel which blocks the light.

SUMMARY OF THE INVENTION

In view of the above problem of the conventional multi-panel LCD device, it is an object of the present invention to provide a multi-panel LCD device, which is capable of suppressing degradation in the image quality caused by a light interference between pixels of plurality of layered LCD panels.

The present invention provides, in a first aspect thereof, a liquid crystal display (LCD) device including: first and second LCD panels each including a pair of transparent substrates and a liquid crystal (LC) layer sandwiched therebetween, the first and second LCD panels being stacked one on another so that each pixel of the first LCD panel overlaps a corresponding pixel of the second LCD panel; a pair of first polarizing films sandwiching therebetween the stacked first and second LCD panels; and a light diffusion film having a light diffusing function and at least one second polarizing film, which are interposed between the first LCD panel and the second LCD panel.

The present invention provides, in a second aspect thereof, a liquid crystal display (LCD) device including: first and second LCD panels each including a pair of transparent substrates and a liquid crystal (LC) layer sandwiched therebetween, the first and second LCD panels being stacked one on another so that each pixel of the first LCD panel overlaps a corresponding pixel of the second LCD panel, the pixel of the first and second LCD panels including a bend and a pair of stripes extending form the bend, the bend of the pixel of the first LCD panel is deviated in angular position from a corresponding bend of the pixel of the second LCD panel by a specific rotational angle.

The present invention provides, in a third aspect thereof, a liquid crystal display (LCD) device including: first and second LCD panels each including a pair of transparent substrates and a liquid crystal (LC) layer sandwiched therebetween, the first and second LCD panels being stacked one on another so that each pixel of the first LCD panel overlaps a corresponding pixel of the second LCD panel, wherein the pair of transparent substrates include an active substrate on which active devices for driving the LCD layer are formed and a counter substrate, and at least one of the counter substrates of the first and second LCD panels is interposed between the active substrate of the first LCD panel and the active substrate of the second LCD panel.

The present invention provides, in a fourth aspect thereof, a liquid crystal display (LCD) device including: a backlight source, a first polarizing film, a first liquid crystal display (LCD) panel, at least one second polarizing film, a second LCD panel and a third polarizing film, which are arranged in this order from a rear side toward a front side of the LCD device; and at least one light diffusion film disposed in front of the first LCD panel.

In accordance with the LCD device of the first aspect of the present invention, the light diffusion film interposed between the first LCD panel and the second LCD panel diffuses the light passed by the first LCD panel and thus gradates the distinction between the bright area and the dark area caused by black matrix of the first LCD panel, thereby alleviating the periodicity of the arrangement of the bright area and the dark area caused by the deviation of the pixel between the first LCD panel and the second LCD panel as observed in a slanted viewing direction. Thus, the moiré caused by light interference is reduced to solve the problem in the multi-panel CD device for achieving a higher contrast ratio.

In accordance with the LCD device of the second aspect of the present invention, the first and second LCD panels are stacked one on another so that bend in the pixel of the first LCD panel is deviated from the bend in the pixel of the second LCD panel by the specific rotational angle. The deviation of the bend means that the portion of the pixel of the first LCD panel extending parallel to the pixel of the second LCD panel alleviates the periodicity of the bright area and the dark area as in the case of the first aspect of the present invention, thereby alleviating the moiré caused by the light interference.

In accordance with the LCD device of the third aspect of the present invention, the active substrate of the first LCD panel on which the active devices are formed is not disposed adjacent to the active substrate of the second LCD panel, whereby the light reflected by the active device on the active substrate of the second LCD device is not reflected by the active device on the active substrate of the first LCD device. This prevents rainbow color caused by the light interference from appearing in the emitted light.

In accordance with the fourth aspect of the present invention, the light diffusion film provided in front of the first LCD panel diffuses the light passed by the first LCD panel to gradate the difference between dark luminance and the bright luminance caused by the black matrix of the first LCD panel, to thereby reduce the spatial frequency of the image on the display screen and thus reduces the moire.

The above and other objects, features and advantages of the present invention will be more apparent from the following description, referring to the accompanying drawings.

BRIEF DESCRIPTION OF THE DRAWINGS

FIGS. 18A, 18B and 18C are top plan views showing the image of pixels of the multi-panel LCD structure located at different positions of the display screen, as observed from the front center of the display screen;

FIG. 19 is a table showing the results of the display test of the LCD devices of the first and second embodiments;

DETAILED DESCRIPTION OF THE PREFERRED EMBODIMENTS

Figure 1:
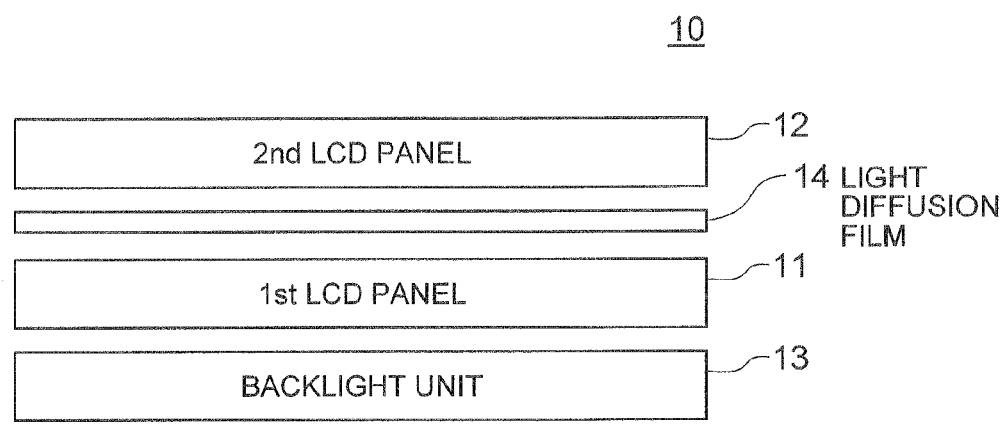
FIG. 1 is a sectional view showing the configuration of a LCD device according to a first embodiment of the present invention.

Now, embodiments of the present invention will be described in detail with reference to the accompanying drawings. FIG. 1 is a sectional view showing the configuration of a LCD device according to a first embodiment of the present invention. The LCD device, generally designated by numeral 10, includes a first LCD panel 11 as a rear-side LCD panel, a second LCD panel 12 as a front-side LCD panel, a backlight unit 13 disposed at the rear of the first LCD panel 11, and a light diffusion layer 14 interposed between the first LCD panel 11 and the second LCD panel 12.

The first and second LCD panels 11 and 12 each include a pair of transparent substrates opposed to each other with a predetermined distance therebetween, a liquid crystal layer sandwiched between the transparent substrates, and a pair of polarizing films each arranged on the surface of a corresponding one of the transparent substrates far from the liquid crystal (LC) layer. Further, at least one of the first and second LCD panels 11 and 12, for example, the second LCD panel 12, includes color filters.

As the display mode of both the first and second LCD panels 11 and 12, lateral-electric-field-mode such as IPS mode may be exemplified. If an IPS-mode LCD panel is used, the pair of polarizing films have light transmission axes (polarizing axes) perpendicular to each other. In addition, the polarizing film of the first LCD panel on the light emitting side or front side thereof has a polarizing axis (transmission axis) is disposed parallel to the transmission axis of the polarizing film of the second LCD panel on the light receiving side or rear side thereof.

The backlight unit 13 is configured as a display light source for the LCD device 10. The first and second LCD panels 11 and 12 are stacked one on another so that the positions of the corresponding pixels exactly overlap each other. Further, the LCD panel are stacked so that the light transmission axis or light absorption axis of the polarizing film on the light emitting side or front side of the first LCD panel 11 is substantially parallel to the light transmission axis or light absorption axis of the polarizing film on the light receiving side or the rear side of the second LCD panel 12. For the first and second LCD panels 11 and 12, the display of each pixel is controlled based on the same image data. The light diffusion layer 14 is inserted between the first LCD panel 11 and the second LCD panel 12. The light diffusion layer 14 diffuses the light emitted from the backlight unit 13 and passed by the first LCD panel 11 to allow the light to enter the second LCD panel 12.

In the present embodiment, as described above, the light diffusion layer 14 is inserted between the first LCD panel 11 and the second LCD panel 12. Diffusion of the light passed by the first LCD panel 11 by using the light diffusion layer 14 gradates the distinction between the bright area and the dark area, which are generated by the presence of interconnect lines or black matrix upon passing the first LCD panel 11. This alleviates the periodicity of the bright area and the dark area, generated by the parallax due to the deviation of the pixel of the first LCD panel from the second LCD panel upon observing the display screen in a slanted viewing direction, alleviating the moiré occurring due to light interference. Accordingly, while achieving a higher contrast ratio by using a multi-panel LCD device, deterioration of the image quality upon observing the LCD device in the slanted direction is avoided.

If the first LCD panel and the second LCD panel are arranged so that both the active panels or TFT panels, on which active devices are arranged, are disposed adjacent to each other without insertion of the light diffusion film, a rainbow color will be observed due to the light interference. The light diffusion film interposed between the first LCD panel and the second LCD panel can alleviate the problem of the rainbow color by separating the TFT panels from each other.

In the multiple-panel LCD device of the present invention, each LCD panel includes a pair of transparent substrates each including an orientation film and a LC layer sandwiched therebetween with the orientation film in contact with the LC layer. Each of the LCD panels includes a pair of polarizing films having optical axes intersecting with each other at an angle of 90 degrees.

The first and second LCD panels may be IPS-mode LCD panel wherein LC molecules in the LC layer are rotated in a plane parallel to the transparent substrates sandwiching therebetween the LC layer to achieve a bright state (light transmission) and a dark state (light interrupt).

Figure 2:
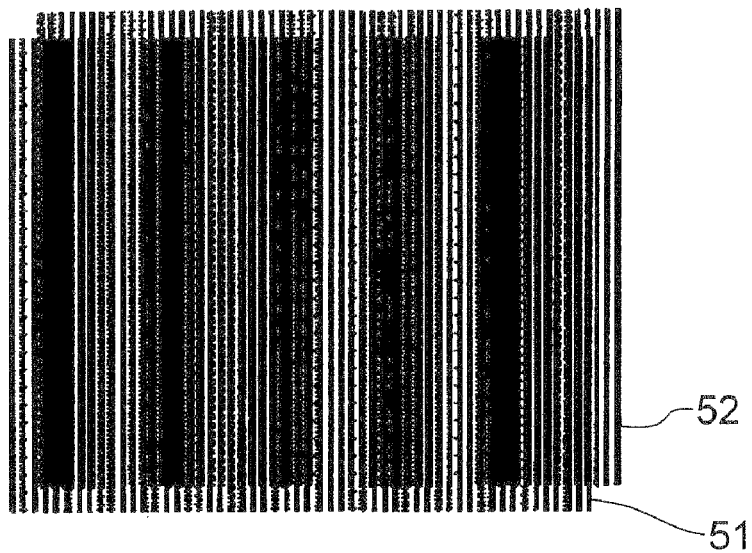
FIG. 2 is a schematic view of a moiré.

The moiré is generated by a difference between two spatial frequencies. The problem of the moiré to be solved by the present invention is such that generated due to the difference between the spatial frequencies formed by the black matrix in the first and second LCD panels, the spatial frequencies causing the light interference. FIG. 2 shows the pseudo spatial frequencies generated in the multiple-panel LCD device. The stripe 51 corresponds to the image generated by the black matrix in the second LCD panel 12 shown in FIG. 1, whereas the stripe 52 corresponds to the image generated by the black matrix in the first LCD panel 11 shown in FIG. 1.

Comparing the stripe 52 against the stripe 51, the stripe 52 has a smaller width and a smaller pitch than the stripe 51. In the structure shown in FIG. 1, it is understood from the fact that the first LCD panel 12 generating the stripe 52 is disposed father than the second LCD panel 11 generating the stripe 51 from the observer, with a gap being disposed between the first LCD panel and the second LCD panel, thereby causing an apparently smaller dimension of the first LCD panel due to the perspective effect. Even if both the LCD panels 11 and 12 have an exactly same structure, the gap generates a difference in the spatial frequency between the first LCD panel and the second LCD panel, the difference being significantly larger than the actual difference in the original spatial frequency and observed as moiré.

Figure 3:
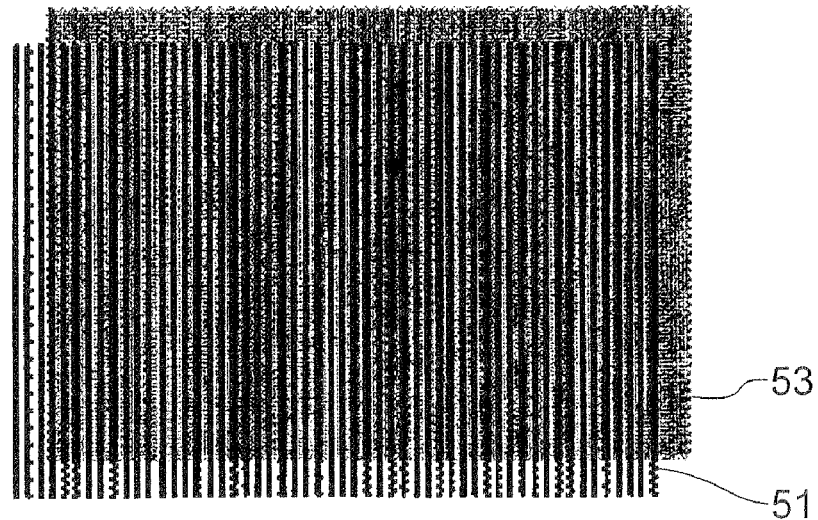
FIG. 3 is a schematic view of an alleviated moiré.

FIG. 3 shows modification of FIG. 2 by gradating or averaging the stripe 52 shown in FIG. 2. Considering application of the above perspective effect to the actual LCD device, the moiré shown in FIG. 2 is alleviated in FIG. 3 and thus is less conceived by the observer. More specifically, FIG. 2 shows a larger difference in the luminance between the bright line and the dark line, thereby indicating a larger contrast ratio. On the other hand, FIG. 3 shows a smaller difference in the luminance between the bright line and the dark line of the stripe 53 due to the gradating or averaging of the stripe 53. The smaller difference in the luminance of the stripe 53 alleviates the light interference between the stripe 51 and the stripe 53, to alleviate the moiré. In other words, the gradating of the stripe 52 allows the boundary between the bright line and the dark line to be vague and obfuscate the pattern of the stripe 52, to alleviate the moiré. As described heretofore, the moiré can be alleviated by reducing the amplitude or contrast ratio of one of the spatial frequencies which cause therebetween the light interference or moiré. For investigating the condition for and degree of alleviation in the moiré, simulation was conducted using a specific model.

Figure 4:
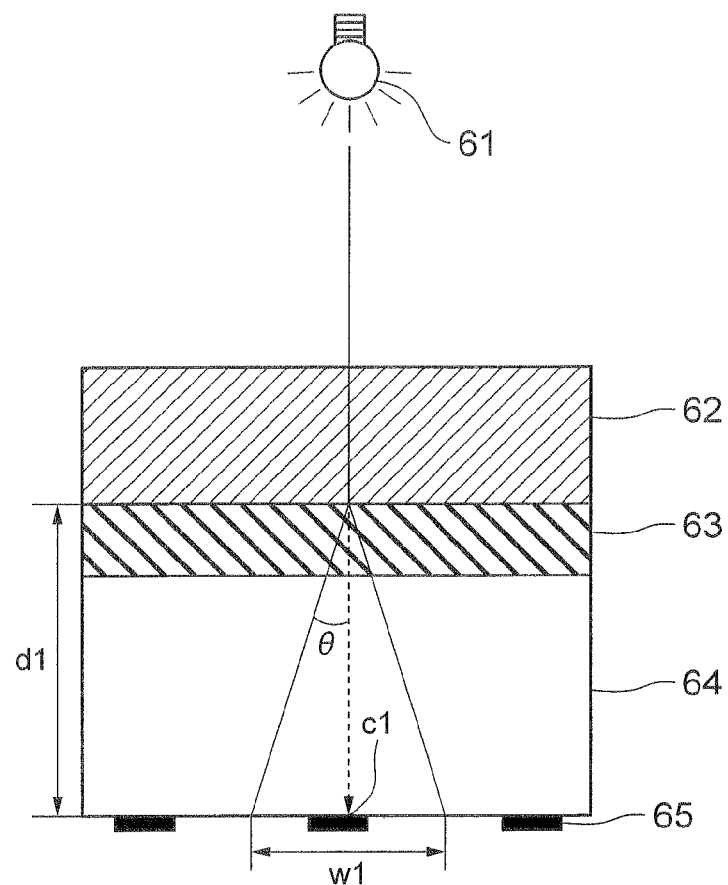
FIG. 4 is a sectional view of part of the LCD device, showing the light transmission in the LCD device.

FIG. 4 shows the model of the multiple-panel LCD device used for the simulation. The model of the LCD device includes a light diffusion film 62, a polarizing film 63, a glass substrate 64, and a black matrix 65, and is irradiated by a light source 61. It is defined herein that d1 (meters), θ (degree) and c1 are the distance between the black matrix 65 and the light diffusion film 62, a diffusion angle of the light effected by the light diffusion film 62 and the point at which the perpendicular to the panel from the light source 61 intersects the plane on which the black matrix 65 is formed, respectively. In this definition, the diffusion angle θ of the light is the half-value angle which provides a light transmission half the maximum light transmission obtained at the point c1.

Figure 5:
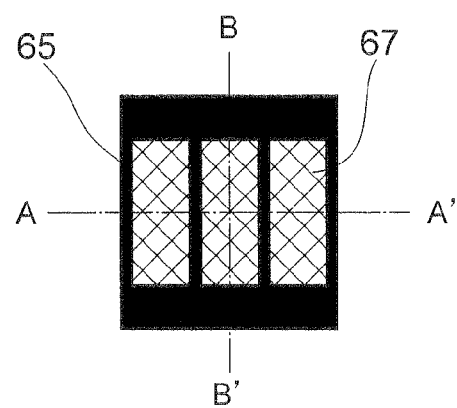
FIG. 5 is a top plan view of a single pixel of a typical LCD device.

FIG. 5 shows an exemplified structure of the pixel as observed by the observer, the pixel having a black matrix 65 by which the light is stopped and an opening 67 through which the light passes. It is assumed that the point c1 is located on a line segment A-A' or the line segment B-B' crossing the black matrix 65 and opening 67, and the case of the point c1 being located on the line B-B' is discussed hereinafter.

In FIG. 4, it is assumed that the light source 61 emits light in the direction perpendicular to the panel, and diffused by the light diffusion film 62 to advance toward the plane on which the black matrix 65 is formed while being diffused within the sector region having a central angle of 2 θ. The thus diffused light forms a shape of circular cone having an apex of 2 θ after reaching the plane on which the black matrix 65 is formed. In other words, the light is diffused within a circular region having a center at the point c1, at which the perpendicular from the light source 61 to the plane intersects the plane.

Figure 6:
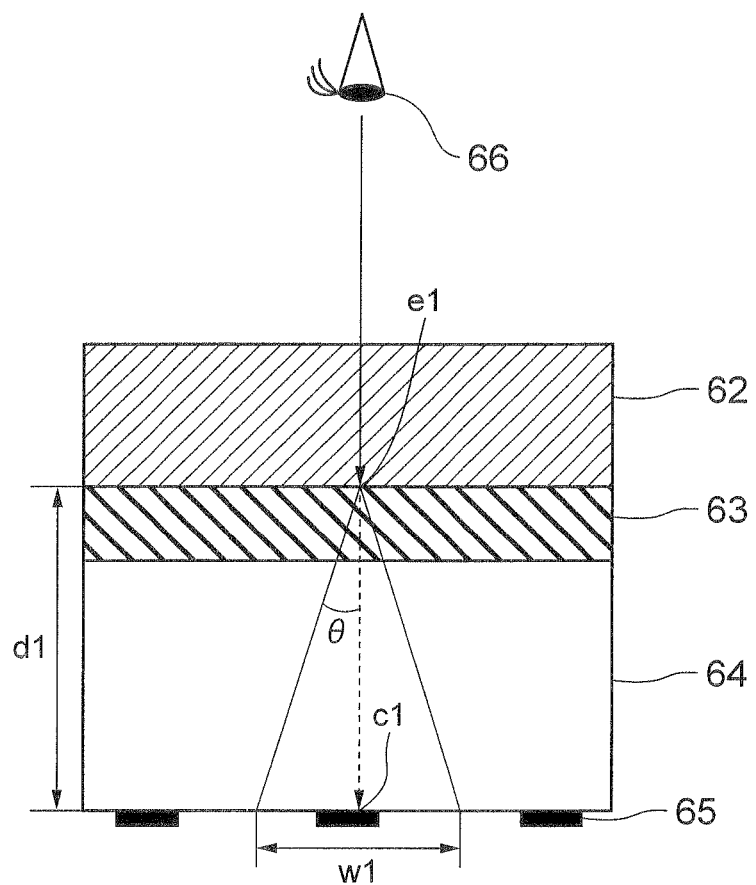
FIG. 6 is a sectional view of part of the LCD device, showing the light transmission in the LCD device.

Considering the reversible nature of the light, as shown in FIG. 6, if the observer 66 is located at the light source 61 shown in FIG. 4, and when the observer looks at the point c1, the observer observes the light passed through the circular region having a center at c1 and a diameter of w1 meters. The diffusion performance of the light diffusion film is larger if the half-value angle θ effected by the light diffusion film is larger, and smaller if the half-value angle θ is smaller. In other words, a higher diffusion performance of the light diffusion film enlarges the circular area having a diameter of w1, whereby the observer looking at the point c1 observes the light passed through a larger area.

The diameter w1 is calculated by the following formula:

$$w1=2d1 \times \tan \theta \quad (1).$$

From the formula (1), the half-value angle θ is obtained by the following equation:

$$\theta=\tan^{-1}(w/2d1) \quad (2).$$

Considering that the black matrix 65 has a width of a1 meters at each stripe thereof and a the gap between adjacent stripes of the black matrix 65 is b1 meters, the way in which the observer observes the image will be discussed hereinafter while assuming different cases.

Figure 7:
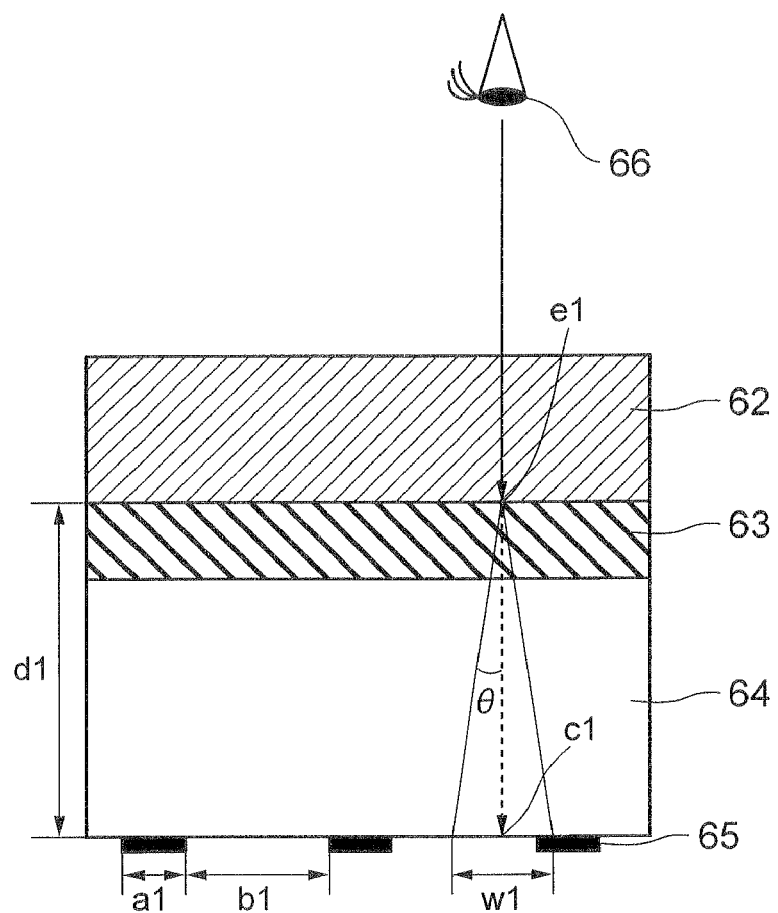
FIG. 7 is a sectional view of part of the LCD device, showing occurrence of moiré.

FIG. 7 shows the first case where w1<a1+b1 in the above situation. If the observer 66 moves parallel to the LCD panel, the relationship w1<a1+b1 allows the luminance of the circular region having a diameter of w1 to be changed between the minimum at which the circular region overlaps the black matrix 65 at a maximum and the maximum at which the circular region overlaps the gap at a maximum. The change of the luminance depending on the viewing point means a larger amplitude of the spatial frequency, such as shown in FIG. 2, thereby causing the moiré.

Figures 8, 9:
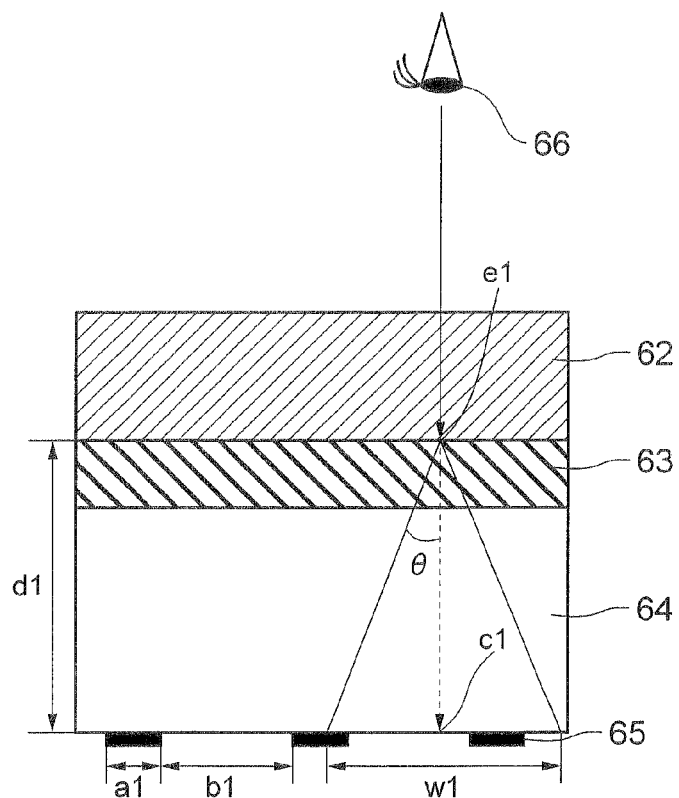
FIG. 8 is a sectional view of part of the LCD device, showing occurrence of moiré.
FIG. 9 is a table showing the grade and the degree of moiré that the observer feels.

FIG. 8 shows the second case where w1>a1+b1. The relationship w1>a1+b1 restricts the change of the luminance, if the observer moves parallel to the LCD panel, because the circular region having a diameter of w1 overlaps the gap b1 of the black matrix 65 at any time. That is, the luminance of the second case changes in an amount significantly smaller than the amount of change of the first case. If the relationship w1 ≫ a1+b1 holds in particular, the change of the luminance will be negligibly small. Thus, in the second case, the amplitude of the spatial frequency is small, as shown in FIG. 3, whereby alleviation of the moiré is expected.

In view of the above, the degree in which the moiré occurring in the LCD panel is observed was evaluated in a subjective five-grade evaluation by a plurality of persons, as shown in the table of FIG. 9. In this evaluation, grade 5 means presence of no moiré, grade 4 means presence of a small degree of moiré which the observer scarcely conceives, grade 3 means presence of a significant degree of moiré which the observer notices and yet does not feel discomfort, grade 2 means presence of considerable degree of moiré by which the observer fees some discomfort, and grade 1 means presence of a large degree of moiré which the observer feels a large discomfort to observe the image on the display screen.

Figure 16:
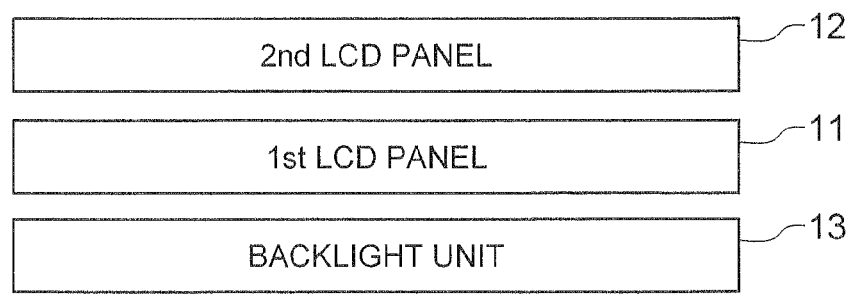
FIG. 16 is a sectional view showing a LCD device according to a second embodiment of the present invention.

A LCD panel was prepared in which a1=77 μm, b1=193 μm and d1=900 μm, and a variety of light diffusion films having different half-value angles were used. The LCD device was observed for the degree of moiré. The luminance distribution along the polar angle was measured using LCD 7000 (trade mark, from Otsuka Densi co.) for the LCD panel which was evaluated at grade 3 in the state of using the light diffusion film. FIG. 16 shows the situation of the measurement.

Figure 10:
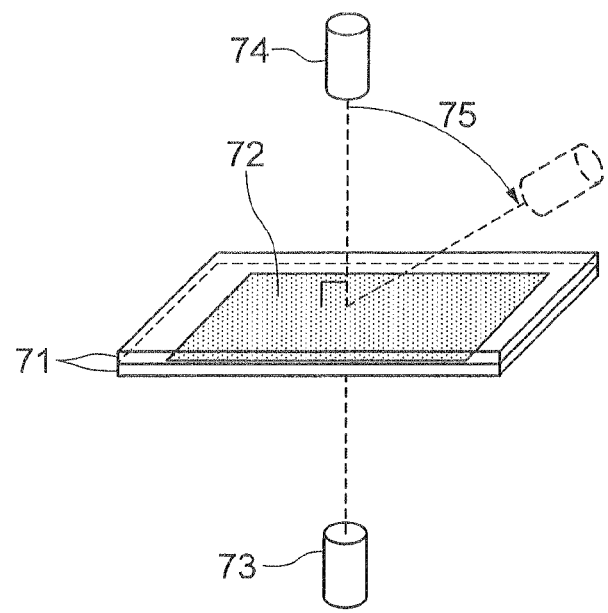
FIG. 10 is a perspective view showing measurement of the luminance distribution for different polar angles.

In FIG. 10, a light diffusion film 72 sandwiched between a pair of glass plates 71 is disposed against a light source 73 so that the light source 73 emits light perpendicular to the diffusion film 72, and an optical sensor 74 is disposed in an opposing relationship with respect to the light source 73, with an intervention of the light diffusion film 72 therebetween. The light source 73 emitted a linearly-polarized light at a constant intensity, and the optical sensor 74 measured the intensity of the light transmitted through the light diffusion film 72 at a polar angle (denoted by numeral 75) between zero degree and 60 degrees. The transmittance of the light diffusion film 72 is determined at a polar angle of zero degree.

Figure 11:
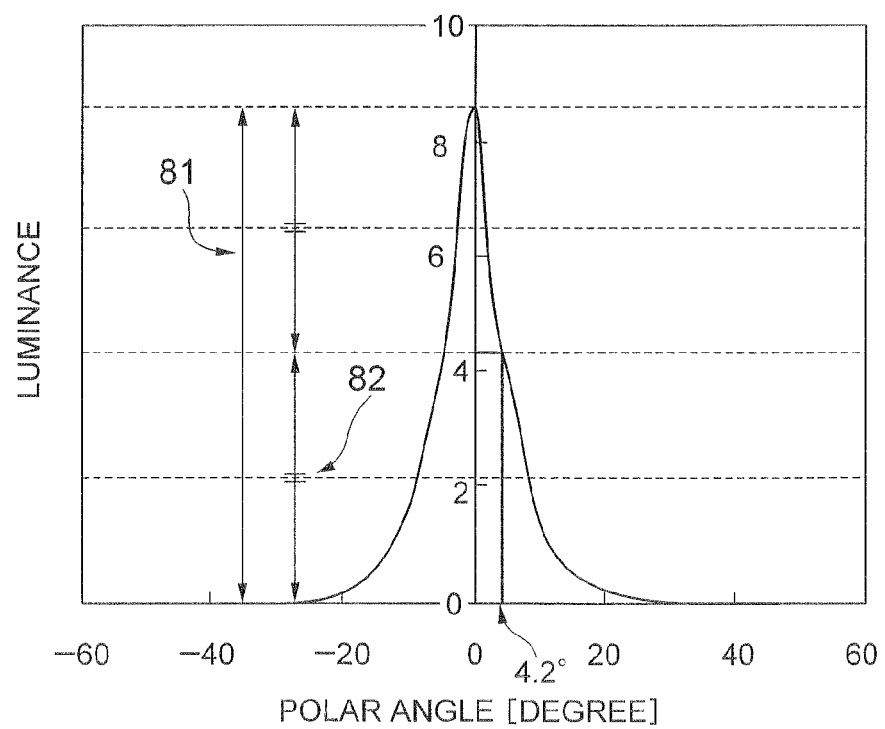
FIG. 11 is a graph showing the luminance distribution plotted against the polar angle.

FIG. 11 shows the luminance distribution plotted with respect to the polar angle of the optical sensor between −60 degrees and +60 degrees for the case of a light diffusion film evaluated at grade 3. As understood from FIG. 11, the luminance assumes a maximum at a polar angle of zero degree, and reduces along with increase of the polar angle, providing a Gaussian curve distribution. Numeral 82 denotes the half value which is half the maximum luminance at the polar angle of zero degree, and is equal to the luminance at a polar angle of 4.2 degrees, which was evaluated at grade 3 for the light diffusion film. Thus, the angle θ obtained by formula (2) is defined herein as the half-value angle, and is used as a factor for evaluating the diffusing performance of the light diffusion film.

Figures 12, 13:
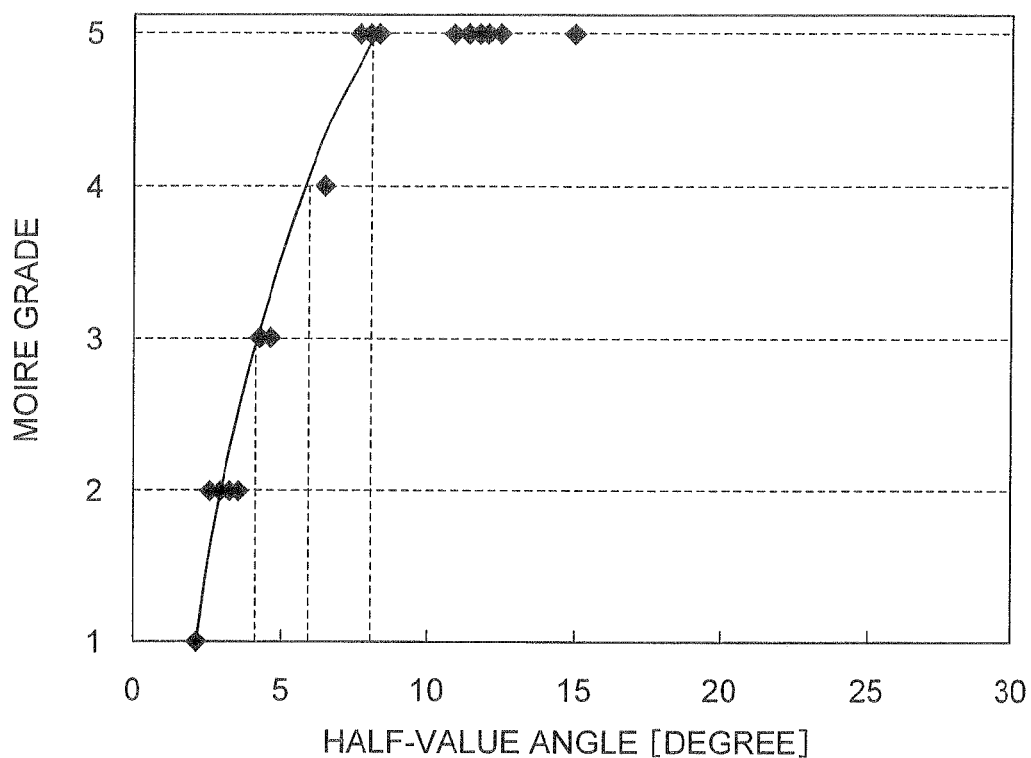
FIG. 12 is a graph showing the relationship between the half-value angle and the grade of moiré.
FIG. 13 is a table showing the relationship between the grade and the degree of moiré.

The relationship between the hall-value angle as described above and the degree of moiré observed during using a variety of light diffusion films was then examined. FIG. 12 shows the result of examination, wherein grade number of moiré is plotted against the half-value angle in terms of degrees. As understood from FIG. 12, grade 1 corresponds to a half-value angle of 2.0 degrees, grade 2 corresponds to a half-value angle of 2.4 degrees, and grade 3 at which the observer does not feel discomfort by the presence of moiré in the image corresponds to a half-value angle of 4.2 degrees. It is also understood that the grade 4, at which the observer conceive the presence itself of the moiré and yet does not feel discomfort during observing the image on the screen, corresponds to a half-value angle of 6.0 degrees or above, and a half-value angle of 8.2 degrees or above is evaluated at grade 5 at which the moiré itself is not conceived.

The limit of half-value angle at which the moiré is not conceived by the observer was then examined using simulation and the degree of moiré observed. In this examination, the degree of reduction in the moiré was obtained based on the half-value angle of a variety of light diffusion film, providing the result shown in FIG. 13, which shows the correspondence between the grade number and the reduction in the moiré (moiré reduction). The moire reduction is defined herein by a ratio of the difference between the brightest luminance and the darkest luminance in the moiré to the average luminance. More specifically the moire reduction is defined by the following formula:

$$MR = 20 \times \log_{10}(B/A),$$

where B and A are the amplitude of moire and mean luminance, respectively. FIG. 13 shows the relationship between the half-value angle and the moiré reduction, based on which the degree of moire in the observation can be evaluated for the specific amplitude of moire with respect to the mean luminance.

Figure 14:
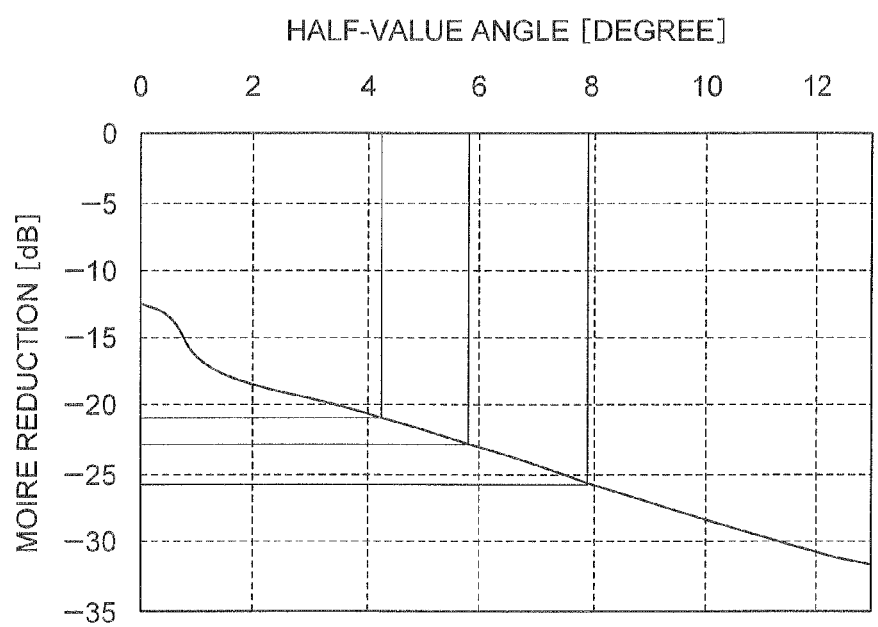
FIG. 14 is a graph showing the relationship between the half-value angle and the moiré reduction.

Thereafter, the relationship between the half-value angle of the light diffusion film and the moire reduction is obtained. FIG. 14 shows the relationship between the half-value angle and the more grade. In FIGS. 13 and 14, the result of the simulation shows that the half-value angle corresponding to a moiré reduction of −18 dB which corresponds to grade 1 is 1.7 degrees, the half-value angle corresponding to a moiré reduction of −18 dB which corresponds to grade 1 is 1.7 degrees, the half-value angle corresponding to a moiré reduction of −19 dB which corresponds to grade 2 is 2.4 degrees, the half-value angle corresponding to a moiré reduction of −21 dB which corresponds to grade 3 is 4.2. degrees, the half-value angle corresponding to a moiré reduction of −23 dB which corresponds to grade 4 is 5.8 degrees, and the half-value angle corresponding to a moiré reduction of −26 degrees which corresponds to grade 5 is 7.9 degrees. Thus, the result of simulation substantially coincides with the result of measurements, revealing the correctness of the theoretical analysis of the present invention.

The LCD panel as described above, i.e., the LCD panel in which $a1=77$ μm, $b1=193$ μm, and $d1=900$ μm is used, with the relationship: $w1=a1+b1=270$ μm being additionally satisfied, for calculating the half-value angle θ for the case of observing the circular region having a diameter w1 including the black matrix and the opening from the formula (2). The result of calculation provided θ=8.5 degrees.

Based on the result, θ=8.5 degrees as a reference, the constant K is determined from the half-value angle at which the grade number is defined. More specifically, by using the relationship:

$$\theta = K \times \tan^{-1}\{(a1+b1)/2d1\} \quad (3),$$

the value of constant K for each grade number is obtained by the ratio of the half-value angle obtained from FIG. 12 to the reference half-value angle θ=8.5 degrees.

For example, grade 1 corresponds to a half-value angle θ=1.7 degrees in FIG. 12, whereby K=0.20 is obtained by the ratio of 1.7/8.5. In this way, the following results:

K=0.20 for grade 1;
K=0.28 for grade 2;
K=0.50 for grade 3;
K=0.68 for grade 4; and
K=0.93 for grade 5 are obtained.

From the above results, assuming that K is a constant for each grade number, if a light diffusion film satisfying the relationship:

$$\theta \geq K \times \tan^{-1}\{(a1+b1)/2d1\} \quad (4)$$

is used, a desired grade can be used. More concretely, by employing the value for K corresponding to grade 3, i.e., K=0.50 or above, a desired state in which the observer does not feel discomfort in the moire is obtained. Thus, a desired performance of the light diffusion film for suppressing the moiré, the constant K should be 0.50 or above for achieving grade 3, preferably 0.68 or above for achieving grade 4, and more preferably 0.93 or above for achieving grade 4.

In the view point of solving the moiré, there is no upper limit of K, and thus a larger K provides a more effective reduction in the moiré.

However, an extremely larger value for the constant K reduces the front luminance, i.e., luminance in the direction normal to the display screen, because the front light intensity is excessively reduced by the large K or higher diffusion performance, although the light intensity of the light source is constant.

The reduction ratio (RR) of the luminance by inserting the light diffusion film is defined from the luminance (B1) before insertion of the light diffusion film and the luminance (B2) after insertion of the light diffusion film as follows:

$$RR = \{(B1-B2)/B1\} \times 100(\%)$$

Figure 15:
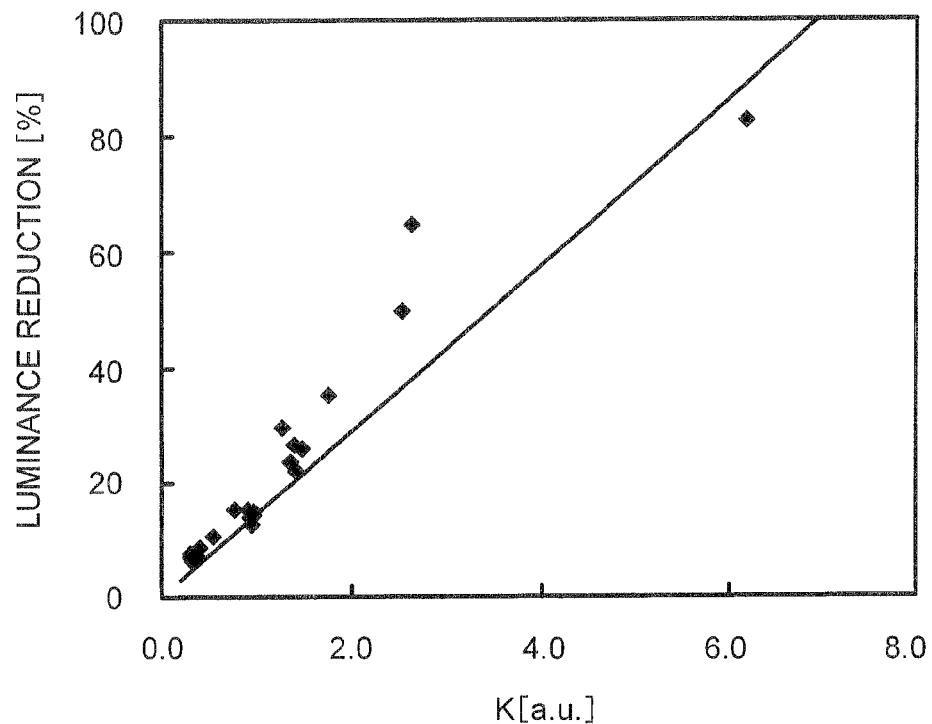
FIG. 15 is a graph showing the relationship between the constant K and the luminance reduction ratio.

FIG. 15 shows the relationship between the reduction ratio of the luminance and the constant K. As understood from FIG. 15, the reduction ratio is proportional to the constant K, and defined by;

$$RR = 14.4 \times K \quad (5)$$

Accordingly, the upper limit for K is determined by the reduction ratio RR of 100%, which provides 6.9 for K in the graph. Thus, the upper limit of K is considered at 6.9.

Examples of the material for the light diffusion film in the present invention include a surface diffusing film such as the optical diffusing sheet described in Patent Publication JP-1994-64604A. The optical diffusing sheet described therein includes a base film and a plurality of embedded films embedded within the base film. The embedded films are such that bead-like particles having different diameters around 1 to 500 μm and nonuniform surface are mixed to have different grain sizes. Instead of the embedded films, a plurality of protruding films having a similar configuration may be provided on the surface of the base film by attachment thereto with adhesion. The optical diffusion film has a total transmission factor of 85 to 88% and a haze controlled in a wide range between 49% and 70%.

Kimoto corp. provides a "Light-up Series", as the material for the light diffusion film, including 100PBA, 75PBU, 38NSH, 100NSH, 100SXE, 50MXE, 100MXE, 38LSE, 50LSE, 75LSE, 100LSE, 188LSE, 100GM2, 188GM2, 100GM3, 188GM3, 50UK2, 100UK2, 125TL2, 125T4, 50UK4, 100UK4, 100DX2, and 188DX2, which provide a total transmission factor between 74.0% and 97%, and a haze of 29.0% to 92.0% (catalogue value). Keiwa corp. provides an "Oparus Series" including BS-910, BS-911, BS-917 BS-913, BS-700, BS-701, BS-702, BS-04, BS-042, 33S-510, BS-511, BS-512, PBS-620N, PBS-620W, PBS-620HG-N, PBS-620HG-W, PBS-070L, PBS-071L, PBS-072L, PBS-070, PBS-071, PBS-072, PBS-070H, PBS-071H, PBS-072H, ZD-007, PBS-067, BS-506, BS-046, BS-036, BS-017, and ZD-097, which provides as wide a haze as 12.8% to 89.7% (catalogue value).

Examples of the material for the light diffusion film include an optical diffusion adhesive sheet described in Patent Publication JP-2006-16515A. The optical diffusing adhesive sheet includes an adhesive layer having a light diffusing function. The optical diffusing adhesive layer includes acrylic copolymer having a refractive index of n1, inorganic particles having a refractive index of n2 and an average grin size of 1 to 5 μm, and a curing agent. The optical diffusing adhesive layer is obtained by adding 0.1 to 50 weight part of organic particles to 100 weight part of acrylic copolymer and adding thereto 0.01 to 15 weight part of curing agent to prepare optical diffusing adhesive, and coating a plastic film with the optical diffusing adhesive on at least one side thereof. The difference |n1−n2| in the refractive index is set within 0.01 and 0.2 to achieve a haze of 50% or above and a total transmission factor of 80% or above in the optical diffusing adhesive layer.

The light diffusion film 14 may be made of optical diffusing adhesive agent described in Patent Publication JP-1999-508622. The optical diffusing adhesive layer includes a pressure-sensitive base material having a refractive index of n1 and filled with organic polymer particles having a refractive index of n2, with the difference |n1−n2| in the refractive index being 0.01 to 0.2, wherein the weight ratio of the base material to the organic polymer particles is 1:1 to 50:1. The organic polymer particles have a diameter of 0.5 to 30 μm, and the pressure-sensitive base material is formed as spherical particles having a diameter of 0.5 to 150 μm. The pressure-sensitive adhesive agent has a specific characteristic determined by the concentration of the organic polymer particles, refractive index difference, the balance between the thickness and the grain size of the diffusion material.

Examples of the material for the light diffusion film 14 include other adhesive sheet, binding agent and organic synthetic resin so long as they have a light diffusing function. The light diffusing film prepared by those materials may be provided at any position in front of, i.e., on the light emitting side of the first LCD panel, to provide the moiré reduction function.

The light diffusion layer 13 preferably has the function of maintaining the original polarized state of the incident light and diffusing the incident light. The reason is as follows. If a linearly-polarized light passed by the first LCD panel 11 has a polarized state after passing through the light diffusion layer 12, the thus polarized light may have a light component blocked by the light-incident-side polarization film of the second LCD panel 12, thereby causing a loss of light after passing through the second LCD panel 12.

As a sheet having the functions of diffusing a linearly-polarized light advancing in a particular direction and maintaining the original polarized state of the linearly-polarized light, there is known a multiple reflection/diffusion sheet, which is formed by layering a plurality of films having different refractive indexes while allowing each of the films to reflect some of the light. Examples of the light diffusion film 14 include DBEF (trade name) manufactured by 3M. In the case using the DBEF as the light diffusion layer 14, the DBEF is arranged so that the light transmission axes of the DBEF, the light-emitting-side polarizing film of the first LCD panel 11 and the light-receiving side polarizing film of the second LCD panel 12 should be directed parallel to one another. The DBEF used as the light diffusion layer 14 can reduce the loss of light and suppress reduction in the luminance, differently from a ordinary light diffusion film without having the function of maintaining the polarized state of the linearly polarized light.

In the present embodiment, on one hand, a higher light diffusion function of the light diffusion film 14 can alleviate the distinction between the bright area and the dark area in a larger degree with respect to the light passed by the first LCD panel 11, thereby alleviating the moiré in a larger degree. On the other hand, however, the higher diffusion function reduces the luminance upon display of a bright state on the screen due to a reduction in the light transmittance of the light diffusion film 14. More specifically, there is a tradeoff between the alleviation of the moiré and the luminance upon display of a bright state. For designing an actual LCD device, the light diffusion function of the light diffusion layer 14 should be determined in consideration of a suitable balance between the luminance upon display of a bright state and the degree of alleviation of the moiré.

JP-2004-512564A as described before recites that a light-reflection polarizing film which reflects the light component oscillating in an undesirable direction may be used instead of a light-absorption polarizing film to improve the luminance. JP-2001-201764A as described before recites use of a DBEF film as a light-reflection polarizing film, which is disposed between two LCD panels stacked one on another. However, the DBEF film has a lower polarizing function as compared to a usual light-absorption polarizing film. Thus, the DBEF film replacing the polarizing film between the two LCD panels cannot be expected to achieve a drastic improvement of the contrast ratio in the multiple-panel LCD device. In contrast thereto, in the present embodiment, a DBEF film configuring the light diffusion layer 14 is provided, in addition to the polarizing film, between the first LCD panel 11 and the second LCD panel 12. This configuration achieves a higher contrast ratio, and also suppresses degradation in the image quality caused by the light interference between the two LCD in a slanted viewing direction.

FIG. 16 is a sectional view of a LCD device 10a according to a second embodiment of the present invention. The LCD device 10a of the present embodiment is configured such that the light diffusion layer 14 is removed from the LCD device 10 of the first embodiment shown in FIG. 1. In the present embodiment, the pixels of the first and second LCD panels 11 and 12 having a specific structure remove the moiré caused by the interference as observed in a slanted viewing direction. The specific structure of the pixels will be described hereinafter. It is assumed herein that the first and second LCD panels 11 and 12 are IPS-mode LCD panels.

Figure 17:
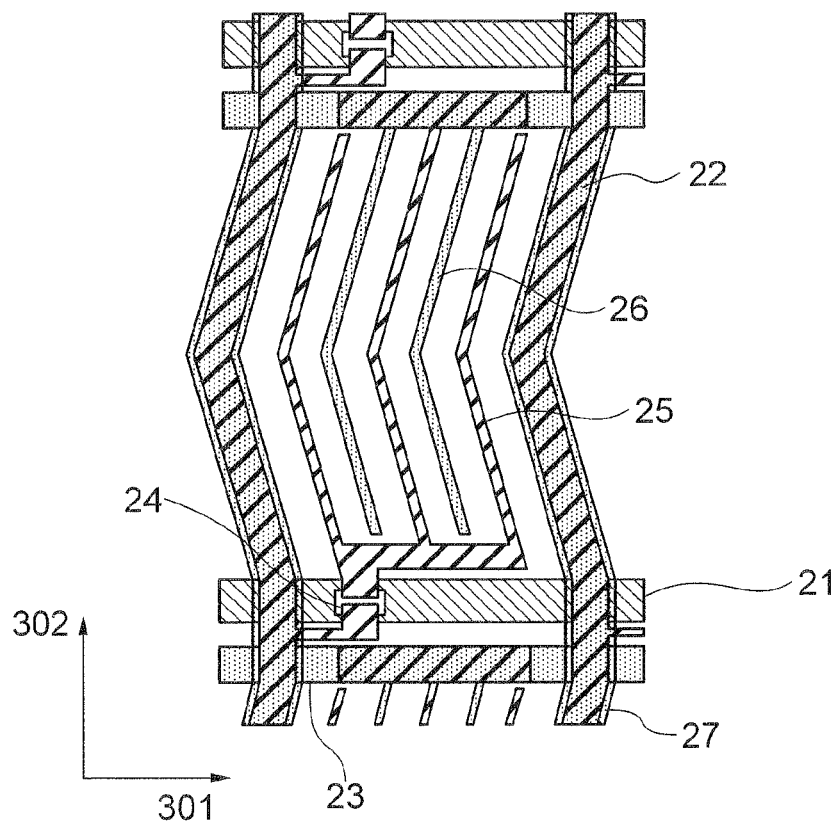
FIG. 17 is a top plan view showing a single pixel of a LCD panel in the second embodiment.

FIG. 17 is a top plan view of a typical pixel in the LCD panels 11 and 12 in the second embodiment. The pixel shown in FIG. 3 belongs to the first LCD panel 11, for example. The pixel is associated with a signal line or gate line 21 extending along a row direction 301, a data line 22 extending along a direction 302, and a TFT (thin-film transistor) 24 disposed in the vicinity of an intersection between the signal line 21 and the data line 22. On/off of the TFT 124 is controlled by the potential of the signal line 21.

The pixel includes a pixel electrode having comb-shape teeth 25 and connected to the data line 22 via the TFT 24, and a common electrode having comb-shape teeth 26 and surface electrode portion 27 which are connected to an inter-pixel common electrode line 23. Within the pixel area, the comb-shape teeth 25 of the pixel electrode oppose the comb-shape teeth 26 and surface electrode portion 27 of the common electrode to drive the LC layer by means of an electric field generated by the potential difference between the pixel electrode and the common electrode.

The comb-shape teeth 25 of the pixel electrode, and the comb-shape teeth 26 and surface electrode portion 27 of the common electrode extend in the column direction 302 and have a single bend at the central position thereof. More specifically, the comb-shape teeth 25 of the pixel electrode, as well as the comb-shape teeth 26 and surface electrode portion 27 of the common electrode, are an angle of −15° (or 165°) tilted away from the column direction 302 toward the row direction 301 in the upper area of the pixel, as viewed from the top side toward the bottom side of the pixel, and are an angle of +15° tilted away from the column direction 302 toward the row direction 301 in the lower area of the pixel, whereby the extending direction of these electrode portions are an angle of +30 degrees bent within the pixel area as viewed from the top side toward the bottom side. It is to be noted that the sign of the angle is expressed in plus as viewed in the right along the row direction. Although a single bend is formed in each electrode portion in FIG. 3, a plurality of bends may be provided in each electrode portion.

In the second LCD panel 12, the comb-shape teeth of the pixel electrode, as well as the comb-shape teeth and surface electrode portion of the common electrode, are bent within the pixel. However, the extending direction and the bend of the electrode portions are 90 degrees away from the extending direction and the bend of the first LCD panel 11. In other word, the electrode portions of the second LCD panel 12 has a structure which is obtained by rotating the structure of FIG. 3 by an angle of 90 degrees.

FIGS. 18A, 18B and 18C show the structure of the electrode portions of the first and second LCD panels in the multi-panel LCD device of the present embodiment. More specifically, FIG. 18A shows the structure of electrode portions of the pixel located on the observers' left of the display screen, FIG. 18B shows the structure of the electrode portions of the pixel located at the center of the display screen, and FIG. 18C shows the structure of the electrode portions of the pixel located on the observers' right of the display screen. In these figures, the solid line 41 denotes the pixel and the electrode portions of the first LCD panel 11, whereas the dotted line 42 denotes the pixel or electrode portions of the second LCD panel 12. It is to be noted that each solid line 41 or each dotted line 42 depicted within the contour solid line or dotted lines represents one of the comb-shape teeth 25 of the pixel electrode, and the comb-shape teeth 26 and surface electrode portion 27 of the common electrode. In this structure, the electrode portions of the first LCD panel are obtained by rotating the corresponding electrode portions of the second LCD panel by an angle of 90 degrees.

Upon observing the LCD device 10a in the direction normal to the LCD panels 11 and 12, as shown in FIG. 18B, the pixel 41 of the first LCD panel 11 and the pixel 42 of the second LCD panel 12 are superposed substantially in the same area. If the viewing angle is switched and the LCD device 10a is observed in a slanted direction, the distance between the observer and the first LCD panel 11 is different from the distance between the observer and the second LCD panel 12. Therefore, upon observing the pixel located on the observers' left by the observer located on the front center of the display screen, the area of the pixel 41 is deviated from the area of pixel 42, as shown in FIG. 18A. Similarly, upon observing the pixel located on the observers' right by the observer located at the front center of the display screen, the area of the pixel 41 is also deviated from the area of pixel 42, as shown in FIG. 18C.

Figure 23A:
FIGS. 23A, 23B and 23C are top plan views showing the image of pixels of the multi-panel LCD structure located at different positions of the display screen, as observed from the front center of the display screen.
Figure 23B:
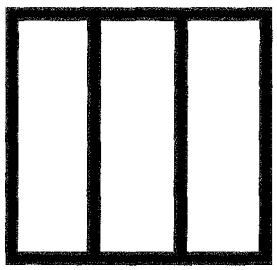
Figure 23C:

Comparing FIG. 18B showing the pixel observed from the front against FIGS. 18A and 18C showing the pixel observed in the slanted direction, there is no substantially difference in the state of overlapping of the comb-shape teeth 25 of the pixel electrode, comb-shape teeth 26 and surface electrode portion 27 of the common electrode of the pixels 41 and 42 between the front view and the slanted view. Therefore, the difference in the luminance between the front view and the slanted view is reduced in the present embodiment as compared to the case of overlapping shown in the conventional structure of FIG. 23, wherein two rectangular pixels are overlapped. This means the luminance has a substantially no difference between the front view and the slanted view.

Further, for the pixel 41 of the first LCD panel 11 and the pixel 42 of the second LCD panel 12, the bending directions of the pixels are 90 degrees deviated from each other, thereby eliminating the portion of the comb-shape teeth 25 of the pixel electrode, comb-shape teeth 26 and surface electrode portion 27 of the common electrode of the pixel 41 extending parallel to the electrodes of the pixel 42. In this manner, the periodicity of the arrangement of the bright area and the dark area is alleviated, thereby removing the problem of the interference fringes such as the moiré.

FIG. 19 is a table showing the results of the display test of the sample LCD devices of the first and second embodiments, the test result including the luminance upon display of bright image and presence or absence of moiré. In this figure, the result of the display test of comparative examples is also illustrated. The first sample included the light diffusion film in the LCD device according to the first embodiment, the second sample included the DBEF film in the LCD device according to the first embodiment, and the third sample had the structure of shown in FIGS. 18A, 18B and 18C according to the second embodiment. The first comparative example was such that the second LCD panel had a pixel obtained by mirror reversing the pixel shown in FIG. 17, with the pixel of the first LCD panel having the structure of FIG. 17. The second comparative example was such that the first LCD panel had a pixel obtained by mirror reversing the pixel shown in FIG. 17, with the pixel of the second LCD panel having the structure of FIG. 17.

Focusing on the luminance upon display of brightest image in the test result shown in FIG. 19 reveals that the second sample including the DBEF film and the third sample, i.e., the second embodiment as well as the first and second comparative examples provided a superior result or relatively superior result, with the first sample being inferior to some extent to the second and third samples and the first and second comparative examples. In the result of the luminance upon display of brightest image, it is noted that the DBEF film which diffuses the incident light while maintaining the polarized state thereof can suppress reduction in the luminance upon display of the brightest image in a larger degree than the light diffusion film which simply diffuses the incident light.

On the other hands focusing on the moiré shown in FIG. 19 reveals that the first through third samples of the embodiments provided a superior result, compared to the first and second comparative examples which generated moiré. This test result reveals that the comparative examples, wherein the pixel structure of the first LCD panel corresponds to the pixel structure obtained by mirror reversing the pixel structure of the second LCD panel, do not effectively reduces the periodicity of the arrangement of the bright area and the dark area because the mirror reverse does not sufficiently remove the portion of the first LCD panel extending parallel to the portion of the second LCD panel. Thus, the first and second comparative examples had a poor image quality.

It is to be noted that although the multiple-panel LCD devices of the above embodiments included IPS-mode LCD panels, the LCD panels of the multiple-panel LCD device are not limited to IPS-mode LCD panels. The LCD panels may be TN-mode or VA-mode LCD panels. If the LCD panels of these modes include a light diffusion film or DBEF film according to the first embodiment or include the pixel structure shown in FIG. 18A etc., the difference in the luminance between the front view and the slanted view is suppressed and the generation of the moiré can be prevented.

In the second embodiment shown in FIG. 18A etc, both the pixels 41 and 42 have an angle difference of 90 degrees therebetween. However, it is enough to remove the parallel component existing between the pixel of the first LCD panel and the pixel of the second LCD panel. Thus, the angle difference is not limited to 90 degrees, and any angle between 0 degree and 180 degrees may be employed, although an angle around 90 degrees is preferred.

Further, an example in which each of the first and second LCD panels 11 and 12 is provided with a pair of polarizing films sandwiching therebetween a pair of transparent substrates has been described in the above embodiments. However, either one of the pair of polarizing film provided in the first LCD panel 11 near the second LCD panel 12 or one of the pair of polarizing films provided in the second LCD panel 12 near the first LCD panel 11 may be omitted. For example, in FIG. 1, the polarizing film of the first LCD panel 11 near the second LCD panel 12 may be omitted. In this case, the light emitted from the front transparent substrate of the first LCD panel 11 is diffused by the light diffusion layer 14 and incident onto the liquid crystal layer of the second LCD panel 12 via the rear polarizing film and the rear transparent substrate of the second LCD panel 12. In this manner, even if one of the polarizing films as described above is omitted, a similar advantage can be obtained.

Figure 20:
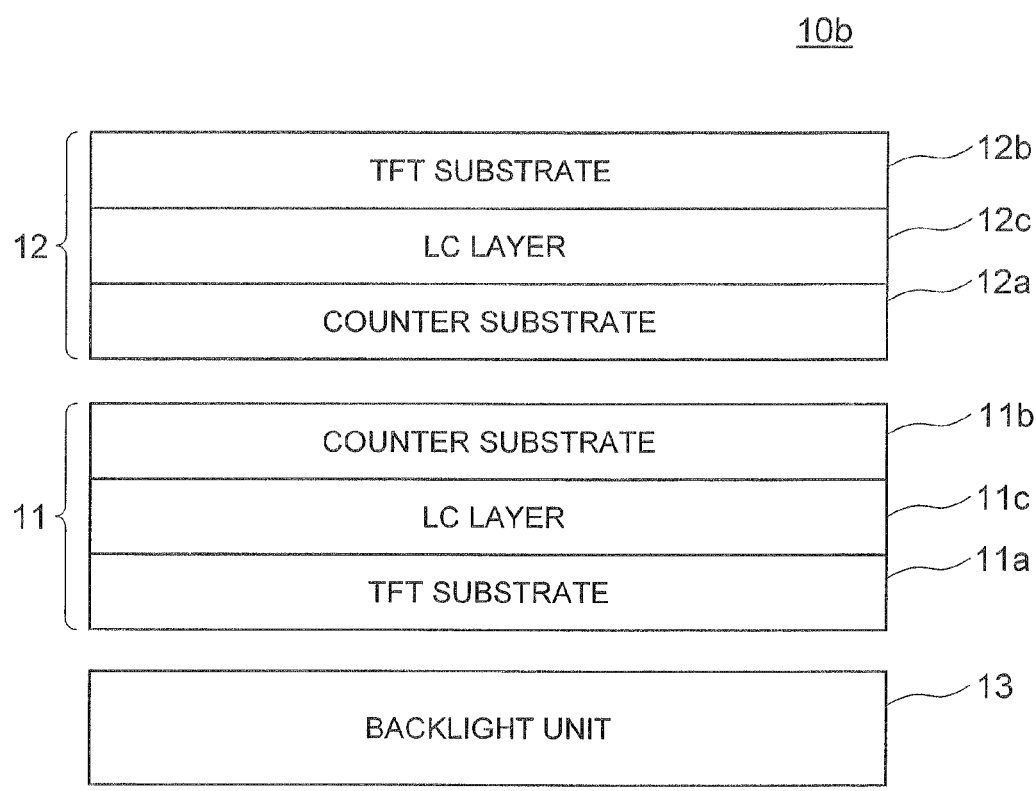
FIG. 20 is a sectional view showing the configuration of a LCD device according to a second embodiment of the present invention.

FIG. 20 shows the configuration of a multi-panel LCD device according to a third embodiment of the present invention. The LCD device includes a backlight unit 13, a first LCD panel 11 and a second LCD panel 12, which area arranged along the transmission direction of light as in the case of the first and second embodiments. The first LCD panel 11 includes a TFT substrate 11a, a LC layer 11c and a counter substrate 11b, which are arranged in this order along the transmission direction of light. The second LCD panel 12 includes a counter substrate 12a, a LC layer 12c and a TFT substrate 12b, which are arranged in this order along the transmission direction of light.

Generally, the TFT substrate of the LCD panel on which active elements such as TFTs are formed may be a light-receiving-side substrate or a light-emission-side substrate. However, if the TFT substrate of the first LCD panel 11 is arranged adjacent to the TFT substrate of the second LCD panel 12 differently from the present embodiment, the light reflected by the TFTs on the TFT substrate of the second LCD panel 12 is reflected again by TFTs on the TFT substrate of the first LCD panel 11. These iterative reflections may generate a light interference, to create rainbow color on the display is screen.

In the present embodiment, both the TFT substrates 11a and 12b on which TFTs are formed are not arranged adjacent to each other. In this configuration, part of the light reflected by a TFT on the TFT substrate 12b of the second LCD panel 12 is absorbed by a black matrix formed on the counter substrate 11b or 12a, and does not reach the TFT substrate 11a of the first LCD panel 11, thereby preventing occurring of rainbow color. This configuration is advantageous particularly in the second embodiment in which the light diffusion layer is not provided between the stacked LCD panels.

It is to be noted that the front luminance of the LCD device may be reduced by inserting the light diffusion film due to a lower transmission factor in the front direction depending on the light diffusing performance of the light diffusion film 14. In view of this problem, a light condensing film may be provided in addition to the light diffusing film 14 in the LCD device, for directing the light once diffused by the light diffusing film 14 in the direction other than the front direction again toward the front direction, or for condensing the light in advance before the light diffusing film 14 diffuses the light.

Figure 21:
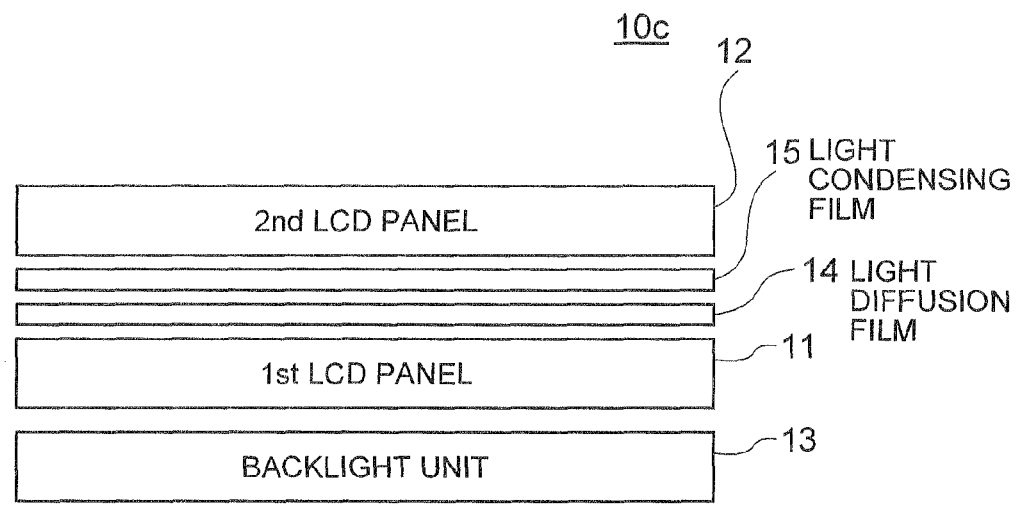
FIG. 21 is a sectional view showing the configuration of a multiple-panel LCD device according to a third embodiment of the present invention.

FIG. 21 shows a multiple-panel LCD device according to a fourth embodiment of the present invention. The LCD device, generally designated by reference mark 10c, has a two-panel structure similarly to the first embodiment. The light diffusion film 14 and the light condensing film 15 are interposed between the first LCD panel 11 and the second LCD panel 12, with the light condensing film 15 being disposed in front of the light diffusion film 14. The light diffusion film 14 has the light diffusing function, as described heretofore, for diffusing the light emitted by the backlight unit 13 and passed by the first LCD panel 11 to pass the diffused light to the second LCD panel 12.

The light condensing film 15 condenses the diffused light, in which the difference generated by the black matrix between the bright luminance and the dark luminance is gradated, to direct the diffused light toward the front direction while maintaining the gradated state thereof, thereby increasing the intensity of the front light once reduced by the light diffusing function of the light diffusion film.

Figure 22:
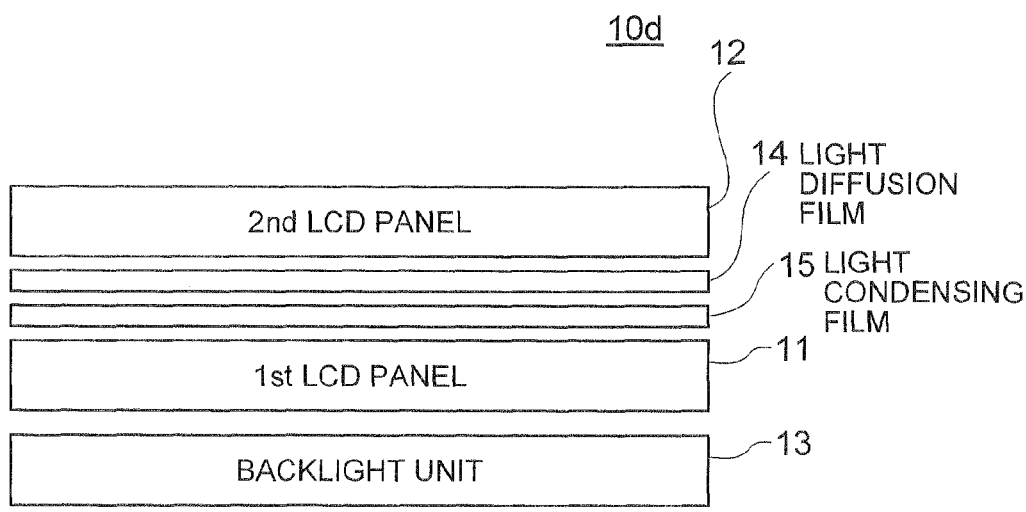
FIG. 22 is a sectional view showing the configuration of a multiple-panel LCD device according to a fourth embodiment of the present invention.

FIG. 22 shows a multiple-panel LCD device according to a fourth embodiment of the present invention. The LCD device, generally designated by reference mark 10d, includes a backlight unit 13, a first LCD panel 11, a light condensing film 15, a light diffusion film 14 and a second LCD panel 12. The light condensing film 15 condenses the light emitted by the backlight unit 13 and passed by the first LCD panel, to pass the light toward the light diffusing film 14. The light diffusion film 14 diffuses the condensed light to the second LCD panel, thereby gradating the difference between the bright luminance and the dark luminance generated by the black matrix, while maintaining the condensed state of the light having a higher transmittance.

Examples of the material for the light condensing film 15 include an optical film such as described in Patent Publication JP-1999-508622. The optical film described therein mounts thereon a structure including a plurality of linear prisms. The linear prisms have a contained angle of 70 to 110 degrees, and a contained angle of 90 degrees provides a highest effect for the light condensing film 15. It is recited in the publication that a pitch of the linear prisms is 10 to 100 μm, and a pitch of 50 μm is efficient. The difference in the refractive index generated at the interface between the linear prisms and the ambient air condenses the light passed by the linear prisms toward the front direction. Sumitomo 3M corp. provides such a lens sheet, "BEEF series" (trade mark).

The light condensing film 15 may be a multiple-reflection sheet such as a DBEF sheet, DBEF-II, provided from 3M corp. The multiple-reflection sheet is such that a plurality of films having different refractive indexes are layered one on another in a thickness direction, each of the layered films having a specific light reflecting function. If DBEF-II is used as the light condensing film, the DBEF-II is disposed so that the light transmission axis of the DBEF-II is parallel to the light transmission axis of the polarizing films provided on the front side of the first LCD panel 11 and on the rear side of the second LCD panel 12.

The multiple-reflection sheet and the light diffusion film may be combined to provide a single multiple-reflection diffusion film for use in the present embodiment. The multiple-reflection diffusion film has both the functions of the multiple-reflection sheet and the light diffusion film to achieve the moiré reduction and suppression of the luminance, and is provided from 3M corp. as "DBEF-D series".

The light condensing film 15, if inserted on the front side of the light diffusion film, condenses the light which is diffused by the light diffusion film 14 to have gradated moiré, thereby achieving a higher luminance. The light condensing film 15, if inserted on the rear side of the light diffusion film 14, condense the light having moiré to increase the luminance before diffusion by the light diffusion film 14, which then reduces the moiré.

The light diffusion film 14 and light condensing film 15 may be provided at any position so long as they are provided in front of the first LCD panel 11, in order for reducing the moiré and increasing the front light intensity. The order of the light diffusion film 14 and light condensing film 15 may be selected as desired. It is also possible to provide the light diffusion film 14 and light condensing film 15 front side of the second LCD panel 12, with the order of these films 14 and 15 being selected as desired. However, it is preferable that these films be interposed between the first LCD panel 11 and the second LCD panel 12.

It is preferable that the pixel size of the first LCD panel be equal to the pixel size of the second LCD panel. However, the first LCD panel may have a lower resolution than the second LCD panel, for example, may have a resolution half the resolution of the second LCD pane, for achieving the advantages of the present embodiment including the moiré reduction and the luminance improvement.

With respect to the configuration wherein the light diffusion film 14 and light condensing film 14 are provided for the moiré reduction and the luminance improvement, a color filter is not an indispensable constituent element in the present invention. That is, the LCD device of the present embodiment may be a monochrome LCD device. If a color LCD device is provided according to the present invention, color filters therein are not limited to RGB color filters, and may include multiple RGBYMC color filters. In addition, a single pixel may be divided into four regions, for example, which correspond to R, G, G, B colors. In an alternative, the four regions may correspond to R, G, B, and achroma.

By stacking the second LCD panel onto the first LCD panel, for example, a gap is inevitably formed between the plane (film) on which the black matrix of the first LCD panel is formed and the plane (film) on which the black matrix of the second LCD panel is formed. This gap generates a parallax, which may be used for displaying a three-dimensional image on the LCD device.

In the LCD panel of the above embodiment, electrodes are formed in a matrix on the surface of one of the transparent substrates near the LC layer, and each intersection between the electrodes of the matrix is provided with a three-terminal element such as TFT, thereby configuring a single pixel. In each pixel, the pixel electrode connected to the three-terminal element and the common electrode provided common to the array of pixels are configured as comb-teeth electrodes for achieving a lateral-electric-field LCD device such as an IPS-mode LCD device. However, the LCD device of the present invention is not limited to such type of the LCD device, and may have thin-film diodes (TFTs) instead of TFTs. The LCD device may be driven by a simple-matrix driving scheme.

The LCD panel in the present invention may be any of vertical-alignment-mode, twisted-nematic-mode, and bent-oriented-mode LCD LCD panels. A retardation compensation film may be provided between the LCD panel and the light diffusion film to improve the viewing angle dependency of the present invention.

The present invention may be applied to any type of the LCD devices having a variety of modes or any image display system such as monitor TV in a broadcasting station, movie display system for use in a theater, and a monitor for a computer system.

Since the above embodiments are described only for examples, the present invention is not limited to the above embodiments and various modifications or alterations can be easily made therefrom by those skilled in the art without departing from the scope of the present invention.

What is claimed is:

1. A liquid crystal display (LCD) device comprising:
   first and second LCD panels each including a pair of transparent substrates and a liquid crystal (LC) layer sandwiched therebetween, said first and second LCD panels being stacked one on another so that each pixel of said first LCD panel overlaps a corresponding pixel of said second LCD panel;
   a pair of first polarizing films sandwiching therebetween said stacked first and second LCD panels; and
   a light diffusion film having a light diffusing function and at least one second polarizing film, which are interposed between said first LCD panel and said second LCD panel, wherein said at least one second polarizing film include a pair of second polarizing films having parallel light transmission axes.

2. The LCD device according to claim 1, wherein said light diffusion film is a multi-reflection light diffusion film including a plurality of layers each having a specific light reflection function.

3. The LCD device according to claim 1, wherein said light diffusion film diffuses a linearly-polarized incident light while maintaining a linearly-polarized state of said incident light.

4. The LCD device according to claim 1, wherein said first and second LCD panels have a substantially equal resolution.

5. The LCD device according to claim 1, wherein each of said pixels of said first and second LCD panels is associated with a three-terminal active device, and said first and second LCD panels are driven by an active-matrix driving scheme capable of driving using a pseudo static driving scheme.

6. An image diagnosis device comprising the LCD device according to claim 1.

7. The LCD device according to claim 1, wherein a color filter is mounted on either one of said pair of transparent substrates of the first LCD panel or either one of said pair of transparent substrates of the second LCD panel.

8. The LCD device according to claim 1, wherein a color filter is mounted on at least one of said pair of transparent substrates of the first LCD panel and at least one of said pair of transparent substrates of the second LCD panel.

9. A liquid crystal display (LCD) device comprising:
   a backlight source, a first a first liquid crystal display (LCD) panel, at least one second polarizing film, a second LCD panel and a third polarizing film, which are arranged in this order from a rear side toward a front side of said LCD device; wherein
   at least one light diffusion film is disposed in front of said first LCD panel, and a color filter is formed on either of the first liquid crystal display (LCD) panel and the second liquid crystal display (LCD) panel, wherein said at least one second polarizing film includes two polarizing films having parallel light transmission axes.

10. The LCD device according to claim 9, wherein said first polarizing film has a transmission axis, which is parallel to a transmission axis of said third polarizing film and perpendicular to a transmission axis of said second polarizing film.

11. The LCD device according to claim 9, wherein the following relationship holds:

$$\theta \geq Kx \tan^{-1}\{(a1+b1)/2d1\}$$

where d1, a1, b1, θ and K are a distance between said light diffusion film and a plane on which a black matrix nearest to said light diffusion film is formed, a width of stripes of said black matrix, a gap between adjacent stripes of said black matrix, a half-value angle representing a diffusion performance of said light diffusion film, and a constant equal to or above 0.50.

12. The LCD device according to claim 11, wherein said K is equal to or above 0.68.

13. The LCD device according to claim 11, wherein said K is equal to or above 0.93.

14. The LCD device according to claim 9, further comprising at least one light condensing film in front of said backlight unit.

15. The LCD device according to claim 14, wherein said light condensing film is disposed in front of said first LCD panel.

16. The LCD device according to claim 14, wherein said light condensing film includes a base film and a plurality of linear prisms arranged parallel to one another on said base film.

17. A liquid crystal display (LCD) device comprising:
a backlight source, a first polarizing film, a first liquid crystal display (LCD) panel, at least one second polarizing film, a second LCD panel and a third polarizing film, which are arranged in this order from a rear side toward a front side of said LCD device; wherein
at least one light diffusion film is disposed in front of said first LCD panel, and
a color filter is formed on either of the first liquid crystal display (LCD) panel and the second liquid crystal display (LCD) panel, further comprising at least one light condensing film, wherein said light diffusion film and said light condensing film are interposed between said first LCD panel and said second LCD panel.

18. A liquid crystal display (LCD) device comprising:
first and second LCD panels each including a pair of transparent substrates and a liquid crystal (LC) layer sandwiched therebetween, said first and second LCD panels being stacked one on another so that each pixel of said first LCD panel overlaps a corresponding pixel of said second LCD panel;
a pair of first polarizing films sandwiching therebetween said stacked first and second LCD panels; and
a light diffusion film having a light diffusing at least one second polarizing film, which are interposed between said first LCD panel and said second LCD panel wherein a parallax between a film of said first LCD panel mounting thereon a black matrix and a film of said second LCD panel mounting thereon another black matrix is used for display of a three-dimensional image.

19. A liquid crystal display (LCD) device comprising:
a backlight source, a first polarizing film, a first liquid crystal display (LCD) panel, at least one second polarizing film, a second LCD panel and a third polarizing film, which are arranged in this order from a rear side toward a front side of said LCD device; wherein
at least one light diffusion film is disposed in front of said first LCD panel, and
a color filter is formed on either of the first liquid crystal display (LCD) panel and the second liquid crystal panel, wherein a parallax between a film of said first LCD panel mounting thereon a black matrix and a film of said second LCD panel mounting thereon another black matrix is used for display of a three-dimensional image.

20. The LCD device according to claim 19, wherein said first and second LCD panels have a substantially equal resolution.

21. The LCD device according to claim 19, wherein each of said first and second LCD panels includes a plurality of pixels each of which pixels is associated with a three-terminal active device, and said first and second LCD panels are driven by an active-matrix driving scheme capable of driving using a pseudo static driving scheme.

22. An image diagnosis device comprising the LCD device according to claim 19.

* * * * *

UNITED STATES PATENT AND TRADEMARK OFFICE
CERTIFICATE OF CORRECTION

| | |
|---|---|
| PATENT NO. | : 7,916,223 B2 |
| APPLICATION NO. | : 11/736513 |
| DATED | : March 29, 2011 |
| INVENTOR(S) | : Kitagawa et al. |

It is certified that error appears in the above-identified patent and that said Letters Patent is hereby corrected as shown below:

Claim 19, Col. 20, line 28 "liquid crystal panel" should be --liquid crystal display (LCD) panel--.

Signed and Sealed this
Eleventh Day of December, 2012

David J. Kappos
*Director of the United States Patent and Trademark Office*